US012519273B2

(12) United States Patent
Miyamoto

(10) Patent No.: US 12,519,273 B2
(45) Date of Patent: Jan. 6, 2026

(54) CONNECTOR UNIT WITH FIXING STRUCTURE FOR ELECTROMAGNETIC SHIELDING MEMBER

(71) Applicant: SUMITOMO WIRING SYSTEMS, LTD., Yokkaichi (JP)

(72) Inventor: Takeru Miyamoto, Yokkaichi (JP)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 305 days.

(21) Appl. No.: 18/252,368

(22) PCT Filed: Nov. 16, 2021

(86) PCT No.: PCT/JP2021/041997
§ 371 (c)(1),
(2) Date: May 10, 2023

(87) PCT Pub. No.: WO2022/107739
PCT Pub. Date: May 27, 2022

(65) Prior Publication Data
US 2024/0006820 A1 Jan. 4, 2024

(30) Foreign Application Priority Data
Nov. 20, 2020 (JP) ................................ 2020-193483

(51) Int. Cl.
*H01R 13/6581* (2011.01)
*H01R 13/405* (2006.01)

(52) U.S. Cl.
CPC ....... *H01R 13/6581* (2013.01); *H01R 13/405* (2013.01); *H01R 2201/26* (2013.01)

(58) Field of Classification Search
None
See application file for complete search history.

(56) References Cited

U.S. PATENT DOCUMENTS

2004/0057187 A1* 3/2004 Kuboshima ...... H01R 13/65912 361/118
2016/0205815 A1* 7/2016 Mori ................. H01R 13/6592 174/360
2018/0219327 A1 8/2018 Hirooka et al.
2023/0182442 A1* 6/2023 Koga ........................ F16B 5/12 29/825

FOREIGN PATENT DOCUMENTS

JP 2014022044 A 2/2014
JP 2015118862 A 6/2015
JP 2015207399 A 11/2015

* cited by examiner

*Primary Examiner* — Oscar C Jimenez

(57) ABSTRACT

A connector unit is provided with an electromagnetic shielding cover which is fixed to a first connector so as to cover the first connector. The electromagnetic shielding cover includes a cover main body, and a first fastening plate which is fixed to the cover main body. One end of an electromagnetic shielding member is sandwiched between the cover main body and the first fastening plate, and is thereby integrated with the first connector. A bracket is fixed to the other end of the electromagnetic shielding member. The bracket is separated from a second connector, and therefore is not integrated with the second connector.

3 Claims, 5 Drawing Sheets

CONNECTOR UNIT WITH FIXING STRUCTURE FOR ELECTROMAGNETIC SHIELDING MEMBER

BACKGROUND

Field of the Disclosure

The present disclosure relates to a connector unit.

Related Art

Japanese Laid-Open Patent Publication No. 2017-22264 discloses an example of a connector unit used in a vehicle or the like. The connector unit includes a first connector, a second connector, and electric wires electrically connecting the first connector and the second connector. Further, the connector unit includes an electromagnetic shielding member, an electromagnetic shielding cover, and a bracket. The electromagnetic shielding member covers the electric wires. One end of the electromagnetic shielding member is fastened to the electromagnetic shielding cover. The other end of the electromagnetic shielding member is fastened to the bracket. The electromagnetic shielding member is, for example, formed from a sheet of conductive metal braiding. The electromagnetic shielding cover is fixed to the first connector to cover the first connector. Part of the electromagnetic shielding cover is bent and deformed to form a folded fastening portion that holds the end of the electromagnetic shielding member thereby fastening the electromagnetic shielding member to the electromagnetic shielding cover.

In the above electromagnetic shielding cover, the folded fastening portion is folded toward the side of the shielding cover from where the electromagnetic shielding member extends. Thus, the formation of the folded fastening portion forms an opening in the electromagnetic shielding cover. Accordingly, the positions of the folded fastening portion and the opening in the electromagnetic shielding cover covering the first connector need to be considered so as not to reduce the electromagnetic shielding effect of the electromagnetic shielding cover.

It is an objective to provide a connector unit allows for fastening of an electromagnetic shielding member without reducing the electromagnetic shielding effect of an electromagnetic shielding cover.

SUMMARY

A connector unit in accordance with the present disclosure includes a first connector, a second connector, electric wires, an electromagnetic shielding cover, an electromagnetic shielding member, and a bracket. The electric wires electrically connect the first connector and the second connector. The electromagnetic shielding cover is fixed to the first connector to cover the first connector. The electromagnetic shielding member is arranged beside the electric wires and formed by a conductor having the form of a sheet. The bracket is formed by a conductor. The electromagnetic shielding cover includes a cover main body and a fastening plate fixed to the cover main body. The cover main body and the fastening plate sandwich an end of the electromagnetic shielding member such that the end is integrated with the first connector. The bracket is fastened to another end of the electromagnetic shielding member. The bracket is separated from the second connector and not integrated with the second connector.

The present disclosure provides a connector unit that allows for fastening of an electromagnetic shielding member without reducing the electromagnetic shielding effect of an electromagnetic shielding cover.

DETAILED DESCRIPTION

Figure 1:
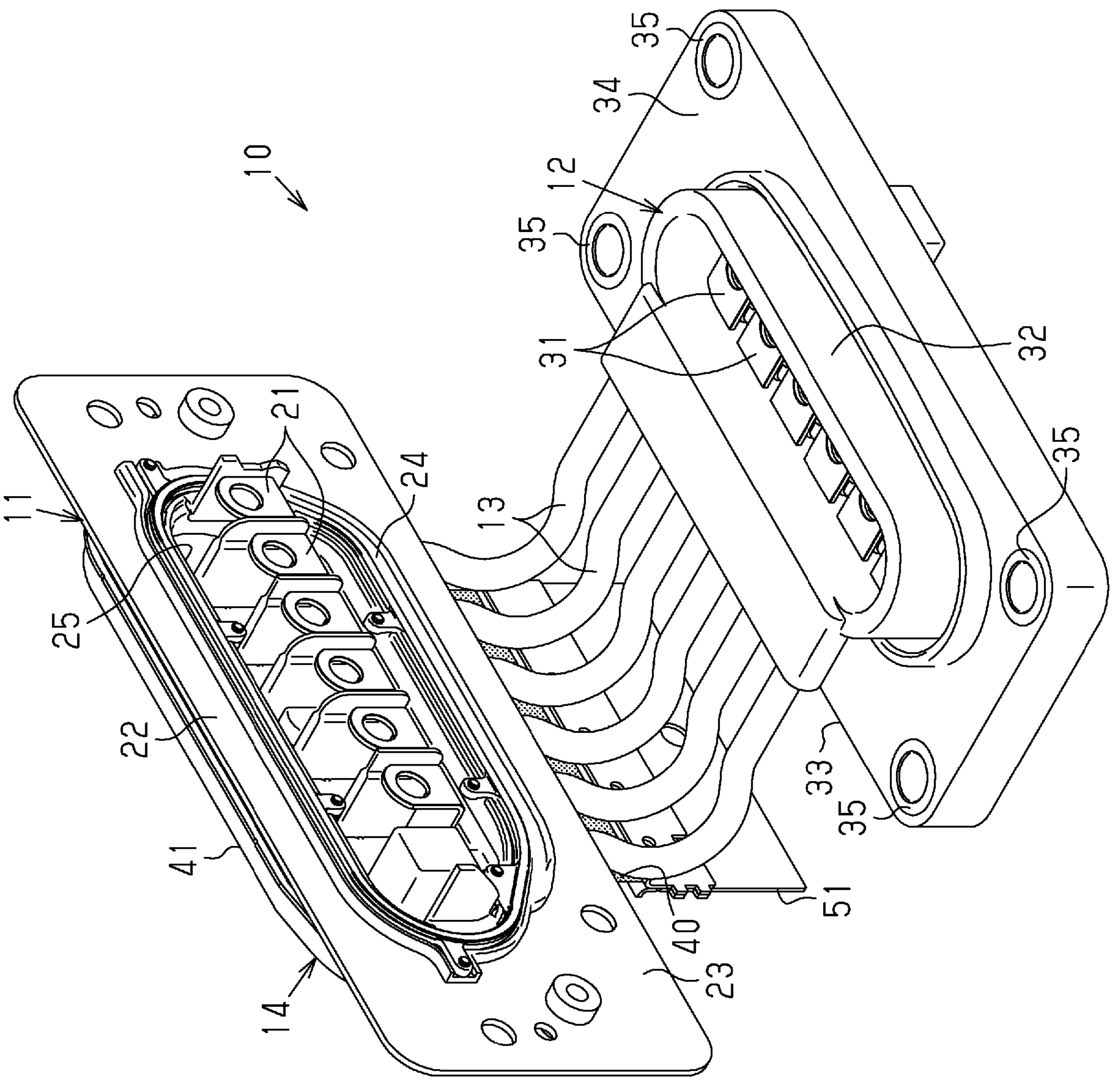
FIG. 1 is a perspective view of a connector unit in accordance with an embodiment.

Embodiments of the present disclosure will now be described.

A connector unit in accordance with the present disclosure is configured in the following manner.

(1) The connector unit includes a first connector, a second connector, electric wires, an electromagnetic shielding cover, an electromagnetic shielding member, and a bracket. The electric wires electrically connect the first connector and the second connector. The electromagnetic shielding cover is fixed to the first connector to cover the first connector. The electromagnetic shielding member is arranged beside the electric wires and formed by a conductor having the form of a sheet. The bracket is formed by a conductor. The electromagnetic shielding cover includes a cover main body and a fastening plate fixed to the cover main body. The cover main body and the fastening plate sandwich an end of the electromagnetic shielding member such that the end is integrated with the first connector. The bracket is fastened to the other end of the electromagnetic shielding member. The bracket is separated from the second connector and not integrated with the second connector.

With this structure, the cover main body and the first fastening plate sandwich and fasten one end of the electromagnetic shielding member. This allows the electromagnetic shielding member to be fastened to the electromagnetic shielding cover without reducing the electromagnetic shielding effect of the electromagnetic shielding cover. Further, the bracket is separated from the second connector so that the bracket can be coupled to, for example, a casing of an in-vehicle device for grounding.

(2) The second connector includes terminals, a holder, and a terminal base. The terminals are respectively connected to the electric wires. The holder holds the terminals and is formed from synthetic resin. The terminal base is coupled to an in-vehicle device and is formed from synthetic resin.

This structure reduces the connector unit in weight as compared to when, for example, the terminal base is formed from metal. The bracket is separated from the second connector so that the bracket is not grounded through the terminal base of the second connector. Thus, the terminal base does not have to be formed by a conductor, and the material of the terminal base can be selected from a wider variety of choices.

(3) The electromagnetic shielding member covers only one side of the electric wires in a direction orthogonal to a direction in which the electric wires are arranged next to one another. This structure limits increases in the number of electromagnetic shielding members used in the connector unit.

(4) The cover main body and the fastening plate each have the form of a plate and are arranged one upon the other in a thickness direction. The cover main body includes a positioning hole used for positioning. The positioning hole extends through the cover main body in the thickness direction. The fastening plate includes a cutout in an end of the fastening plate. The positioning hole and the cutout are equal in width. As viewed in the thickness direction of the fastening plate, part or all of the positioning hole and part of the electromagnetic shielding member are located in a region corresponding to the cutout.

With this structure, when coupling the electromagnetic shielding cover and the electromagnetic shielding member, the fastening plate can be positioned relative to the cover main body by aligning the positioning hole of the cover main body with the cutout of the fastening plate. Further, when the electromagnetic shielding member is sandwiched between the cover main body and the fastening plate, an edge of the electromagnetic shielding member is visually recognized through the cutout to determine whether the edge is located near the end of the fastening plate where the cutout is arranged. This allows the electromagnetic shielding member to be positioned while being checked through the cutout. Thus, the electromagnetic shielding member is easily positioned and fastened to the electromagnetic shielding cover more efficiently.

DETAILED DESCRIPTION

A specific example of the connector unit in accordance with the present disclosure will now be described with reference to the drawings. To facilitate understanding, configurations may be partially exaggerated or simplified in the drawings. Further, elements in the drawings may not be to scale. In the present specification, "orthogonal" includes not only strictly orthogonal cases but also includes generally orthogonal cases within a range allowing the advantages of the present embodiment to be obtained.

In the present specification, "the form of a plate" includes a plate-shape of which corners and edges are chamfered or rounded. Also, a recess, a projection, and the like may be formed on part of or all of the plate-shape. The term "cylindrical" as used in this description is not limited to a structure formed by a circumferential wall that extends continuously to be closed in the circumferential direction and also includes cylindrical structures formed by combining multiple parts or a structure that is C-shaped and open in a circumferential direction. Cylindrical shapes include circular, elliptic, and polygonal shapes.

Connector Unit 10

Figure 2:
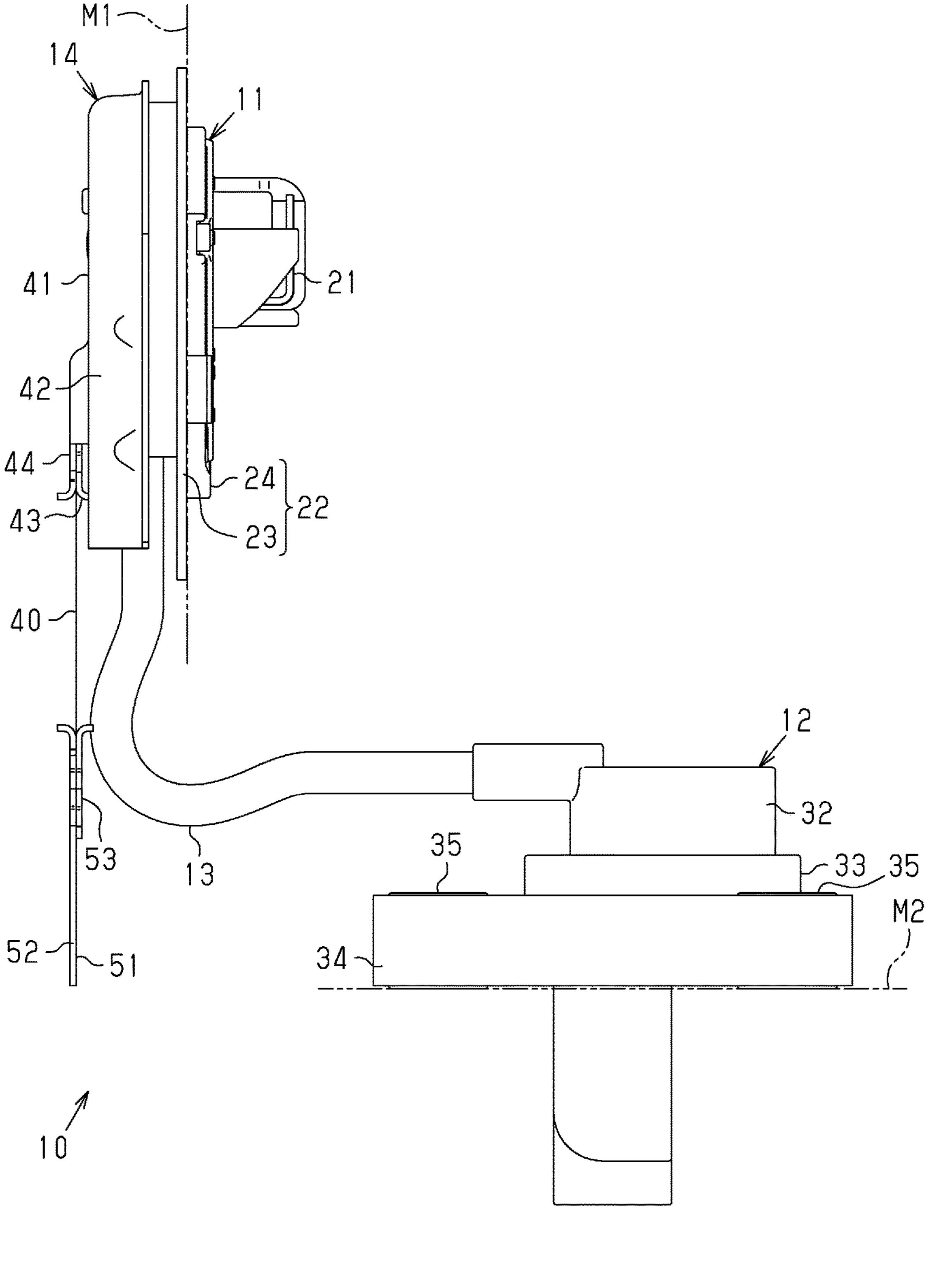
FIG. 2 is a side view of the connector unit in accordance with the same embodiment.

As shown in FIGS. 1 and 2, a connector unit 10 in accordance with the present embodiment includes a first connector 11, a second connector 12, electric wires 13, and a shield unit 14. The electric wires 13 electrically connect the first connector 11 and the second connector 12.

As shown in FIG. 1, the first connector 11 includes first terminals 21. The second connector 12 includes second terminals 31. One end of each electric wire 13 is connected to a corresponding one of the first terminals 21. The other end of the electric wire 13 is connected to a corresponding one of the second terminals 31. The first connector 11 and the second connector 12 are, for example, high-voltage connectors.

As shown in FIG. 2, the first connector 11 is coupled to a first in-vehicle device M1. The first in-vehicle device M1 is, for example, an inverter. The first terminals 21 are respectively connected to terminals (not shown) arranged in the first in-vehicle device M1. The second connector 12 is coupled to a second in-vehicle device M2. The second in-vehicle device M2 is, for example, a driving motor for a battery electric vehicle, a hybrid electric vehicle, or the like. The second terminals 31 shown in FIG. 1 are respectively connected to terminals (not shown) arranged in the second in-vehicle device M2.

First Connector 11

The first connector 11 includes the first terminals 21 and a first holder 22 that holds the first terminals 21.

As shown in FIGS. 1 and 2, the first holder 22 includes, for example, a metal base 23 and a resin member 24. The resin member 24 is integrated with the base 23. The base 23 is, for example, formed by stamping a metal plate. The base 23 is fastened to, for example, an outer surface of the casing of the first in-vehicle device M1 by bolts or the like (not shown). The casing of the first in-vehicle device M1 is formed by a conductor. Further, the casing of the first in-vehicle device M1 is grounded.

The resin member 24 is formed through insert molding using the first terminals 21 as inserts. The first terminals 21 are embedded in the resin member 24 such that the first terminals 21 are partially disposed at the inner side of the resin member 24. The electric wires 13 are connected to the first terminals 21 at the inner side of the resin member 24.

The resin member 24 includes an open portion 25 shown in FIG. 1. The first terminals 21 are visually recognized inside the open portion 25. The first terminals 21 are connected to the terminals of the first in-vehicle device M1 through the open portion 25.

Second Connector 12

The second connector 12 includes the second terminals 31, a second holder 32, and a terminal base 33. The second holder 32 holds the second terminals 31.

As shown in FIGS. 1 and 2, the second holder 32 is formed from, for example, synthetic resin. The second holder 32 is formed through insert molding using the second terminals 31 as inserts. The electric wires 13 are connected to the second terminals 31 at the inner side of the second holder 32. The second holder 32 is coupled to the terminal base 33.

The terminal base 33 is fastened to, for example, an outer surface of the casing of the second in-vehicle device M2 by bolts or the like (not shown). The casing of the second in-vehicle device M2 is formed by a conductor. Further, the casing of the second in-vehicle device M2 is grounded.

The terminal base 33 is, for example, mainly formed from synthetic resin. Specifically, the terminal base 33 includes a base body 34 formed from synthetic resin. Cylindrical collars 35 are embedded in the base body 34 to receive fastening bolts (not shown). The base body 34 is formed from synthetic resin except for the collars 35. The collars 35 are formed from a material, such as metal, having a higher rigidity than the synthetic resin forming the main portion of the base body 34.

The terminal base 33 holds a number of terminals (not shown). One end of each terminal of the terminal base 33 is connected to a corresponding one of the second terminals 31. The other end of the terminal of the terminal base 33 is connected to a corresponding one of the terminals arranged in the second in-vehicle device M2.

Shield Unit 14

The shield unit 14 includes an electromagnetic shielding member 40, an electromagnetic shielding cover 41, and a bracket 51. One end of the electromagnetic shielding member 40 is fastened to the electromagnetic shielding cover 41. The other end of the electromagnetic shielding member 40 is fastened to the bracket 51. Each of the electromagnetic shielding cover 41 and the bracket 51 is formed by a conductor. The electromagnetic shielding cover 41 is integrated into the first connector 11. On the other hand, the bracket 51 is separated from the second connector 12 and not integrated with the second connector 12. The bracket 51 is, for example, grounded through the casing of the second in-vehicle device M2. The phrase "the bracket 51 is not integrated with the second connector 12" means that the bracket 51 is not fixed to any component of the second connector 12. Accordingly, when the second connector 12 and the bracket 51 are fixed together to the casing of the second in-vehicle device M2, the bracket 51 is not integrated with the second connector 12.

Electromagnetic Shielding Member 40

The electromagnetic shielding member 40 is formed by a conductor having the form of a sheet. The electromagnetic shielding member 40 has flexibility. The electromagnetic shielding member 40 is formed by, for example, conductive strand braiding having the form of a sheet. Further, the strands of the electromagnetic shielding member 40 may be formed from, for example, a metal material including copper, aluminum, or the like. The electromagnetic shielding member 40 has the form of, for example, a rectangular sheet.

The electromagnetic shielding member 40 is at least partially arranged beside the electric wires 13. The electromagnetic shielding member 40 covers only one side of the electric wires 13 in a direction orthogonal to the direction in which the electric wires 13 are arranged next to one another. In other words, the other side of the electric wires 13, opposite to where the electromagnetic shielding member 40 is arranged, is not covered by an electromagnetic shielding member.

One end of the electromagnetic shielding member 40 is fastened to the electromagnetic shielding cover 41, which is fixed to the first connector 11. That is, the electromagnetic shielding cover 41 integrates the electromagnetic shielding member 40 with the first connector 11.

Electromagnetic Shielding Cover 41

Figure 3:
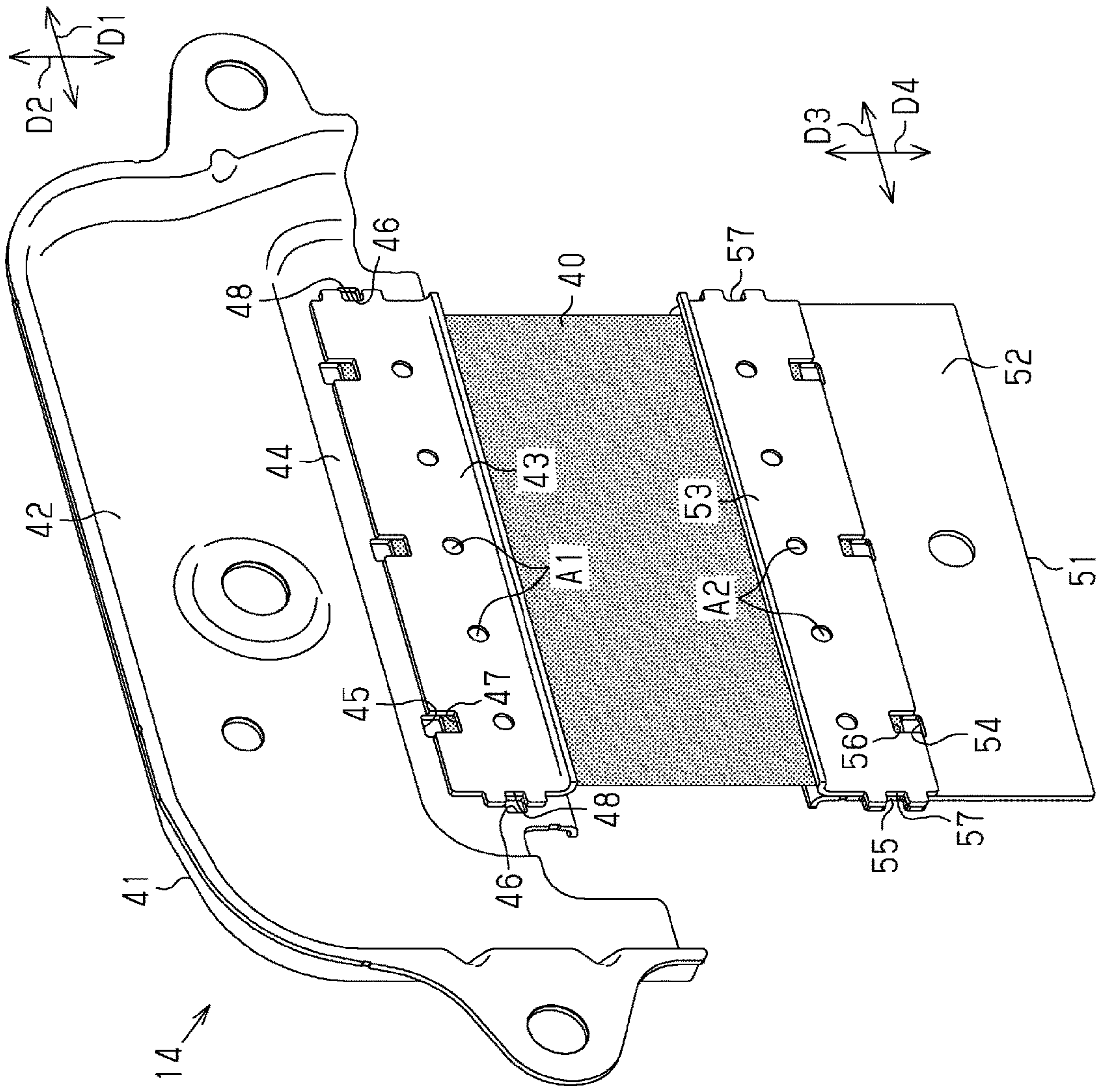
FIG. 3 is a perspective view of a shield unit in accordance with the same embodiment.
Figure 4:
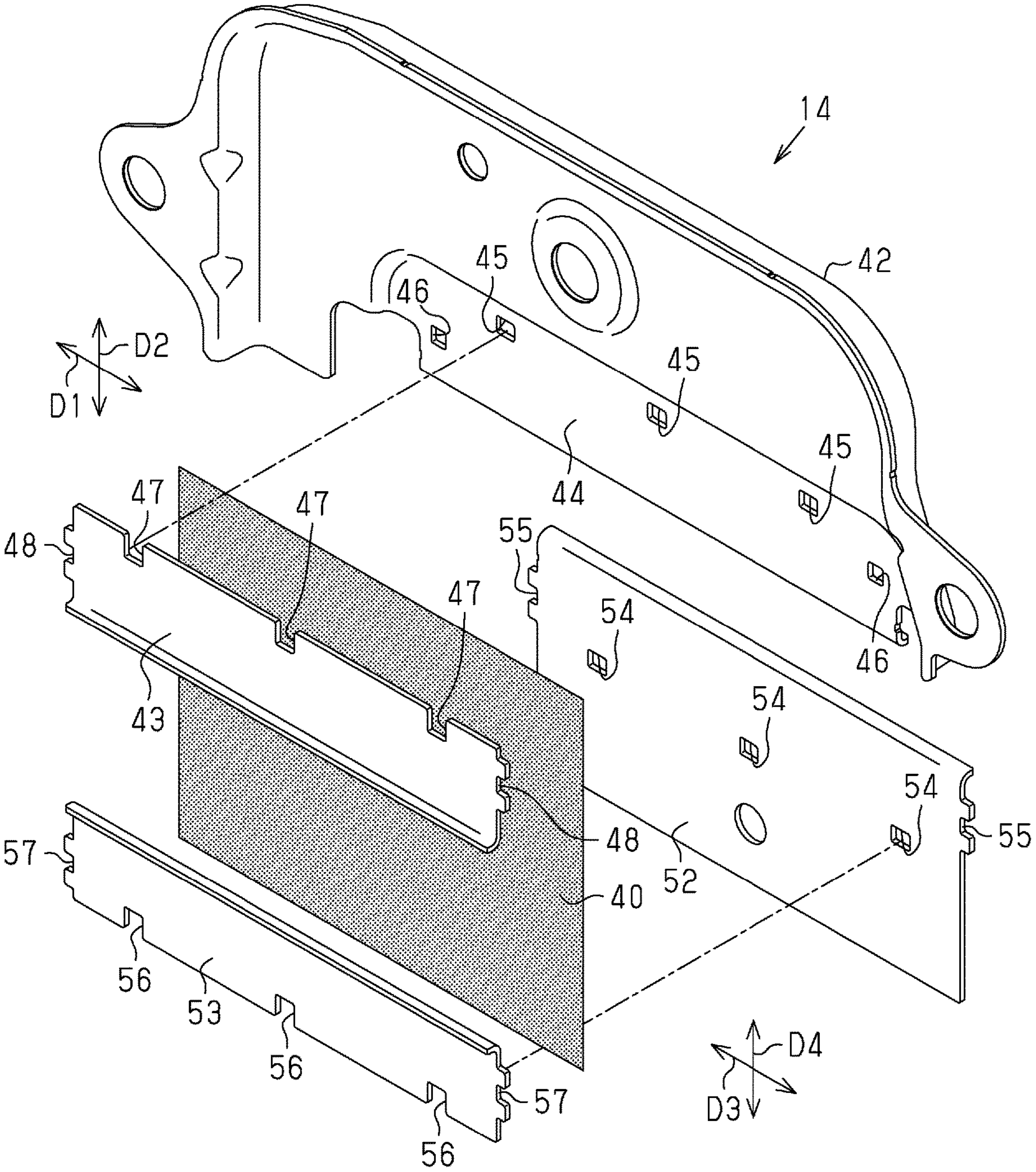
FIG. 4 is an exploded perspective view of the shield unit in accordance with the same embodiment.

As shown in FIGS. 3 and 4, the electromagnetic shielding cover 41 includes a cover main body 42 and a first fastening plate 43. The cover main body 42 covers the first connector 11. The cover main body 42 has the form of a plate. The cover main body 42 is, for example, formed by stamping a metal plate.

The cover main body 42 is fixed to the first holder 22. The cover main body 42 is fastened to, for example, the base 23 by bolts or the like (not shown). The cover main body 42 covers a side surface of the first holder 22 that is opposite to a side facing the first in-vehicle device M1. Further, the cover main body 42 covers at least the open portion 25 of the resin member 24 in the first holder 22.

The cover main body 42 includes a fastening portion 44 fastened to one end of the electromagnetic shielding member 40. The fastening portion 44 has substantially the form of a plate. The first fastening plate 43 is fixed to the fastening portion 44.

The first fastening plate 43 has substantially the form of a plate. The first fastening plate 43 is formed by, for example, a metal plate. The first fastening plate 43 has a substantially rectangular shape as viewed in a thickness direction.

The fastening portion 44 and the first fastening plate 43 are arranged one upon the other in the thickness direction. The fastening portion 44 and the first fastening plate 43 sandwich and fasten one end of the electromagnetic shielding member 40. The first fastening plate 43 opposes the first holder 22 in the thickness direction at a part incorporating the portion where the first terminals 21 are connected to the electric wires 13.

Figure 5:
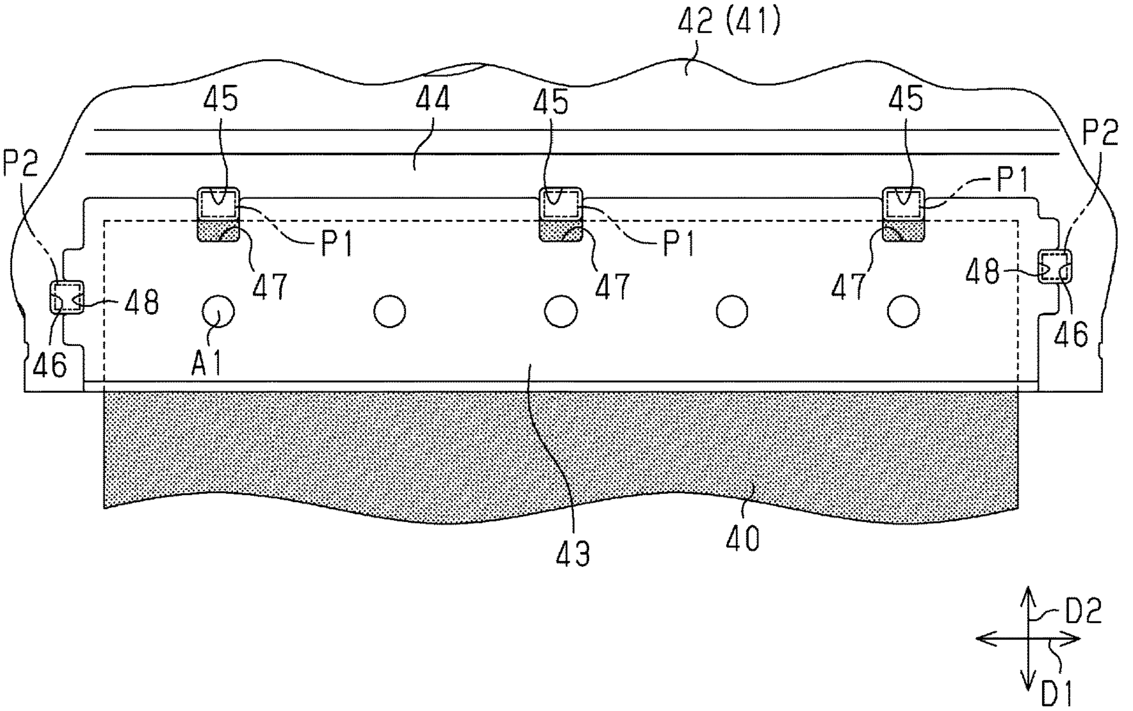
FIG. 5 is an enlarged front view showing part of the shield unit near an electromagnetic shielding cover in accordance with the same embodiment.

As shown in FIGS. 4 and 5, the cover main body 42 includes first positioning holes extending through the fastening portion 44 in the thickness direction. Each first positioning hole 45 has, for example, a substantially rectangular shape as viewed in the thickness direction of the fastening portion 44. For example, a number of first positioning holes 45 are arranged next to one another in a first direction D1 that is orthogonal to the thickness direction of the fastening portion 44. The first positioning holes 45 are, for example, arranged along one of the long sides of the substantially rectangular first fastening plate 43. In the following description, a direction orthogonal to both of the thickness direction of the fastening portion 44 and the first direction D1 will be referred to as the second direction D2. In the present embodiment, the long sides of the first fastening plate 43 extend in the first direction D1, and the short sides of the first fastening plate 43 extend in the second direction D2.

The cover main body 42 includes second positioning holes 46 extending through the fastening portion 44 in the thickness direction. Each second positioning hole 46 has, for example, a substantially rectangular shape as viewed in the thickness direction of the fastening portion 44. For example, two second positioning holes 46 are arranged. The second positioning holes 46 are, for example, arranged at positions corresponding to the two ends of the first fastening plate 43 in the first direction D1, that is, the positions corresponding to the two short sides of the first fastening plate 43.

As shown in FIG. 5, the first fastening plate 43 includes first cutouts 47 in one end of the first fastening plate 43 in the second direction D2. Each first cutout 47 is a cutout recessed from the end of the first fastening plate 43 in the second direction D2 as viewed in the thickness direction of the first fastening plate 43. For example, a number of first cutouts 47 are arranged next to one another in the first direction D1. For example, each first cutout 47 has the same shape and the same size.

The first cutouts 47 correspond to the first positioning holes 45, respectively. Specifically, in a state in which the first fastening plate 43 is fixed to the fastening portion 44, each first cutout 47 and corresponding first positioning hole 45 are located at the same position in the first direction D1. Further, the first cutout 47 is formed to have the same width as the first positioning hole 45 in the first direction D1.

The first cutout 47 is separated from the first positioning hole 45 in the second direction D2. Further, as viewed in the thickness direction of the first fastening plate 43, part of the first positioning hole 45 and part of the electromagnetic shielding member 40 are located in a region corresponding to the first cutout 47. In the region, the part of the first positioning hole 45 and the part of the electromagnetic shielding member 40 are, for example, aligned in the second direction D2.

The first fastening plate 43 includes second cutouts 48 in the ends of the first fastening plate 43 in the first direction D1. Each second cutout 48 is a cutout recessed from the corresponding end of the first fastening plate 43 in the first direction D1 as viewed in the thickness direction of the first fastening plate 43.

The second cutout 48 is aligned with the corresponding second positioning hole 46 in the thickness direction of the fastening portion 44 and the first fastening plate 43. Further, the second cutout 48 is equal in width to the second positioning hole 46 in the second direction D2. Thus, when coupling the electromagnetic shielding cover 41 and the electromagnetic shielding member 40, the first fastening plate 43 can be positioned relative to the fastening portion 44 in the first direction D1 and the second direction D2 by aligning the second positioning holes 46 with the corresponding second cutouts 48.

The first fastening plate 43 is fixed to the fastening portion 44 through, for example, swaging. The first fastening plate 43 is fixed to the fastening portion 44 with a punch (not shown) in a state in which the electromagnetic shielding member 40 is arranged therebetween. The punch presses a number of locations set in the first direction D1. This forms a number of press marks A1 in the fastening portion 44 and the first fastening plate 43 in the first direction D1. Each press mark A1 is a depression formed when pressed by the punch.

Bracket 51

As shown in FIGS. 3 and 4, the bracket 51 includes a bracket body 52 and a second fastening plate 53. The bracket body 52 has the form of a plate. The bracket body 52 is, for example, formed by stamping a metal plate.

The second fastening plate 53 is fixed to the bracket body 52. The second fastening plate 53 has substantially the form of a plate. The second fastening plate 53 is formed by, for example, a metal plate. The second fastening plate 53 has a substantially rectangular shape as viewed in the thickness direction. In the present embodiment, the second fastening plate 53 is identical to the first fastening plate 43 in shape and size. The first fastening plate 43 and the second fastening plate 53 are identical components and interchangeable.

The bracket body 52 and the second fastening plate 53 are arranged one upon the other in the thickness direction. The bracket body 52 and the second fastening plate 53 sandwich and fasten the other end of the electromagnetic shielding member 40.

Figure 6:
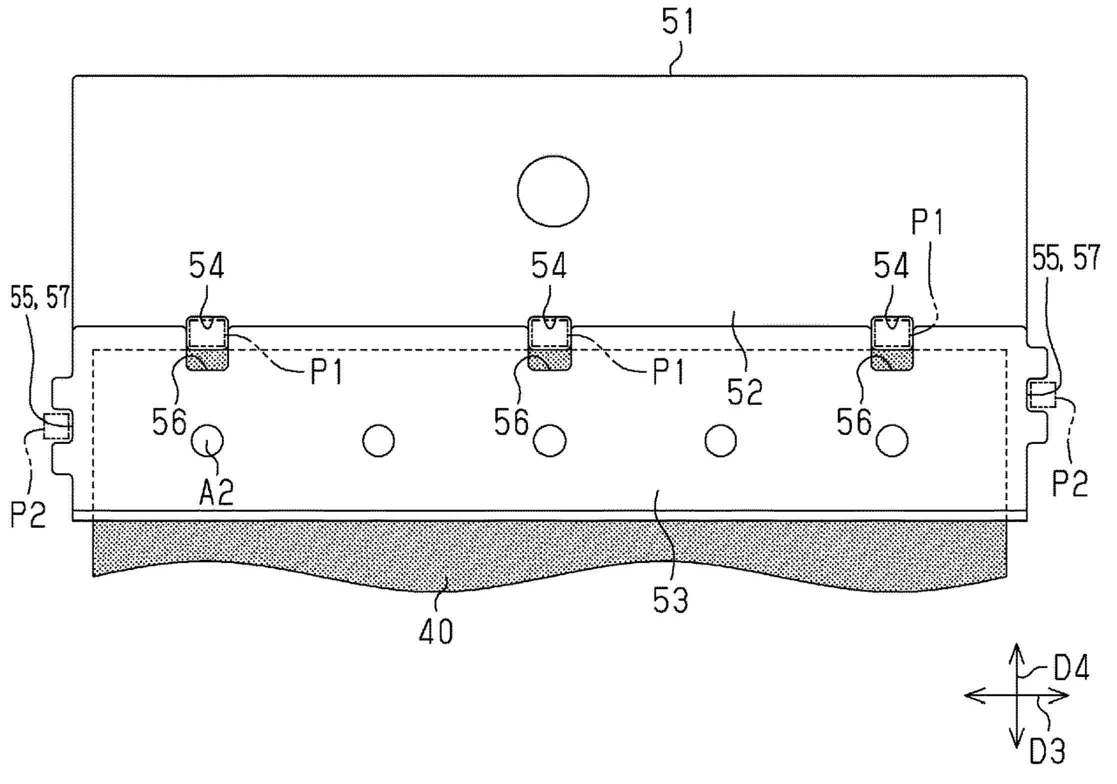
FIG. 6 is an enlarged front view showing part of the shield unit near a bracket in accordance with the same embodiment.

As shown in FIGS. 4 and 6, the bracket body 52 includes first positioning holes 54 extending through the bracket body 52 in the thickness direction. Each first positioning hole 54 has, for example, a substantially rectangular shape as viewed in the thickness direction of the bracket body 52. For example, a number of first positioning holes 54 are arranged next to one another in a first direction D3 that is orthogonal to the thickness direction of the bracket body 52. The first positioning holes 54 are, for example, arranged along one of the long sides of the substantially rectangular second fastening plate 53. In the following description, a direction orthogonal to both of the thickness direction of the bracket body 52 and the first direction D3 will be referred to as the second direction D4. In the present embodiment, the long sides of the second fastening plate 53 extend in the first direction D3, and the short sides of the second fastening plate 53 extend in the second direction D4.

The bracket body 52 includes positioning recesses 55. Each positioning recess 55 is, for example, a cutout. The positioning recess 55 is a cutout recessed from a corresponding end of the bracket body 52 in the first direction D3 as viewed in the thickness direction of the bracket body 52. For example, two positioning recesses 55 are arranged. The positioning recesses 55 are arranged in the two ends of the bracket body 52 in the first direction D3, respectively. The positioning recesses 55 are, for example, arranged at positions corresponding to the two ends of the second fastening plate 53 in the first direction D3, that is, the positions corresponding to the two short sides of the second fastening plate 53.

As shown in FIGS. 6, the second fastening plate 53 includes first cutouts 56 in one end of the second fastening plate 53 in the second direction D4. Each first cutout 56 is a cutout recessed from the end of the second fastening plate 53 in the second direction D4 as viewed in the thickness direction of the second fastening plate 53. For example, a number of first cutouts 56 are arranged next to one another in the first direction D3. For example, each first cutout 56 has the same shape and the same size.

The first cutouts 56 correspond to the first positioning holes 54, respectively. Specifically, in a state in which the second fastening plate 53 is fixed to the bracket body 52, each first cutout 56 and the corresponding first positioning hole 54 are located at the same position in the first direction D3. Further, the first cutout 56 is formed to have the same width as the first positioning hole 54 in the first direction D3.

The first cutout 56 is separated from the first positioning hole 54 in the second direction D4. Further, as viewed in the thickness direction of the second fastening plate 53, part of the first positioning hole 54 and part of the electromagnetic shielding member 40 are located in a region corresponding to the first cutout 56. In the region, the part of the first positioning hole 54 and the part of the electromagnetic shielding member 40 are, for example, aligned in the second direction D4.

The second fastening plate 53 includes second cutouts 57 in the ends of the second fastening plate 53 in the first direction D3. Each second cutout 57 is a cutout recessed from the corresponding end of the second fastening plate 53 in the first direction D3 as viewed in the thickness direction of the second fastening plate 53.

The second cutout 57 is aligned with the corresponding positioning recess 55 in the thickness direction of the bracket body 52 and the second fastening plate 53. Further, the second cutout 57 is equal in width to the positioning recess 55 in the second direction D4. Thus, when coupling the bracket 51 and the electromagnetic shielding member 40, the second fastening plate 53 can be positioned relative to the bracket body 52 in the first direction D3 and the second direction D4 by aligning the positioning recesses 55 with the corresponding second cutouts 57.

The second fastening plate 53 is fixed to the bracket body 52 through, for example, swaging. The second fastening plate 53 is fixed to the bracket body 52 with a punch (not shown) in a state in which the electromagnetic shielding member 40 is arranged therebetween. The punch presses a number of locations set in the first direction D3. This forms a number of press marks A2 in the bracket body 52 and the second fastening plate 53 in the first direction D3. Each press mark A2 is a depression formed when pressed by the punch.

A manner in which the electromagnetic shielding member 40 is fastened to the electromagnetic shielding cover 41 will now be described.

First, the fastening portion 44 of the cover main body 42 is set on, for example, a die of a swaging tool (not shown). In this case, as shown in FIG. 5, first positioning pins P1 projecting from the die are respectively inserted into the first positioning holes 45 of the fastening portion 44. Also, second positioning pins P2 projecting from the die are respectively inserted into the second positioning holes 46 of the fastening portion 44. This positions the fastening portion 44 relative to the die in the first direction D1 and the second direction D2.

Then, one end of the electromagnetic shielding member 40 is arranged on the fastening portion 44 of the cover main body 42 set on the die. In this case, the edge of the electromagnetic shielding member 40 in the second direction D2 is forced against the first positioning pins P1 projecting out of the first positioning holes 45. This positions the end of the electromagnetic shielding member 40 in the second direction D2.

Subsequently, the first fastening plate 43 is arranged on the electromagnetic shielding member 40 set on the fastening portion 44. In this case, the second positioning pins P2 are inserted into the second cutouts 48 of the first fastening plate 43. This positions the first fastening plate 43 relative to the die and the fastening portion 44 in the first direction D1 and the second direction D2.

Also, the first positioning pins P1 are inserted into the first cutouts 47 of the first fastening plate 43. This positions the first fastening plate 43 relative to the die and the fastening portion 44 in the first direction D1. There is a gap between the first positioning pin P1 and the edge of the corresponding first cutout 47 in the second direction D2. This allows the edge of the electromagnetic shielding member 40 to be visually recognized through the gap. Thus, in a state in which the electromagnetic shielding member 40 is sandwiched between the fastening portion 44 and the first fastening plate 43, the electromagnetic shielding member 40 can be positioned while the edge is being checked through the first cutouts 47. After the electromagnetic shielding member 40 is positioned, the fastening portion 44 and the first fastening plate 43 are fastened together to the electromagnetic shielding member 40 through, for example, swaging.

A manner in which the electromagnetic shielding member 40 is fastened to the bracket 51 will now be described.

First, the bracket body 52 is set on, for example, the die. In this case, as shown in FIG. 6, the first positioning pins P1 are respectively inserted into the first positioning holes 54 of the bracket body 52. Also, the second positioning pins P2 are respectively inserted into the positioning recesses 55 of the bracket body 52. This positions the bracket body 52 relative to the die in the first direction D3 and the second direction D4.

Then, the other end of the electromagnetic shielding member 40 is arranged on the bracket body 52 set on the die. In this case, the edge of the electromagnetic shielding member 40 in the second direction D4 is forced against the first positioning pins P1 projecting out of the first positioning holes 54. This positions the end of the electromagnetic shielding member 40 in the second direction D4.

Subsequently, the second fastening plate 53 is arranged on the electromagnetic shielding member 40 set on the bracket body 52. In this case, the second positioning pins P2 are inserted into the second cutouts 57 of the second fastening plate 53. This positions the second fastening plate 53 relative to the die and the bracket body 52 in the first direction D3 and the second direction D4.

Also, the first positioning pins P1 are inserted into the first cutouts 56 of the second fastening plate 53. This positions the second fastening plate 53 relative to the die and the bracket body 52 in the first direction D3. There is a gap between the first positioning pin P1 and the edge of the corresponding first cutout 56 in the second direction D4. This allows the edge of the electromagnetic shielding member 40 to be visually recognized through the gap. Thus, in a state in which the electromagnetic shielding member 40 is sandwiched between the bracket body 52 and the second fastening plate 53, the electromagnetic shielding member 40 can be positioned while the edge is being checked through the first cutouts 56. After the electromagnetic shielding member 40 is positioned, the bracket body 52 and the second fastening plate 53 are fastened together to the electromagnetic shielding member 40 through, for example, swaging.

The operation of the present embodiment will now be described.

The electromagnetic shielding member 40 covers the side of the electric wires 13. Further, the electromagnetic shielding member 40 is grounded through the casing of the first in-vehicle device M1 and the casing of the second in-vehicle device M2. In this manner, the electromagnetic shielding member 40 limits the electromagnetic waves radiated from the electric wires 13 to the outside.

The present embodiment has the following advantages.

(1) The cover main body 42 and the first fastening plate 43 sandwich and fasten one end of the electromagnetic shielding member 40. This allows the electromagnetic shielding member 40 to be fastened to the electromagnetic shielding cover 41 without reducing the electromagnetic shielding effect of the electromagnetic shielding cover 41. Further, the bracket 51 is separated from the second connector 12 so that the bracket 51 can be coupled to, for example, a casing of an in-vehicle device for grounding.

(2) The second connector 12 includes the second terminals 31 connected to the electric wires 13, the second holder 32 holding the second terminals 31 and formed from synthetic resin, and the terminal base 33 coupled to the second in-vehicle device M2 and formed from synthetic resin. This structure reduces the connector unit 10 in weight as compared to when, for example, the terminal base 33 is formed from metal. The bracket 51 is separated from the second connector 12 so that the bracket 51 is not grounded through the terminal base 33 of the second connector 12. Thus, the terminal base 33 does not have to be formed by a conductor, and the material of the terminal base 33 can be selected from a wider variety of choices.

(3) The electromagnetic shielding member 40 covers only one side of the electric wires 13 in the direction orthogonal to the direction in which the electric wires 13 are arranged next to one another. This structure limits increases in the number of electromagnetic shielding members 40 used in the connector unit 10.

(4) In the electromagnetic shielding cover 41, the cover main body 42 and the first fastening plate 43 each have the form of a plate and are arranged one upon the other in the thickness direction. The cover main body 42 includes the first positioning holes 45 extending through the cover main body 42 in the thickness direction. The first fastening plate 43 includes the first cutouts 47 in one end of the first fastening plate 43. The first positioning holes 45 are each formed to have the same width as the first cutout 47 in the first direction D1. As viewed in the thickness direction of the first fastening plate 43, part of the first positioning hole 45 and part of the electromagnetic shielding member 40 are located in a region corresponding to the first cutout 47.

With this structure, when coupling the electromagnetic shielding cover 41 and the electromagnetic shielding member 40, the first fastening plate 43 can be positioned relative to the fastening portion 44 by aligning the first positioning holes 45 with the corresponding first cutouts 47. Further, when the electromagnetic shielding member 40 is sandwiched between the fastening portion 44 and the first fastening plate 43, the edge of the electromagnetic shielding member 40 is visually recognized through the first cutouts 47 to determine whether the edge is located near the end of the first fastening plate 43. This allows the electromagnetic shielding member 40 to be positioned while being checked through the first cutouts 47. Thus, the electromagnetic shielding member 40 is easily positioned and fastened to the electromagnetic shielding cover 41 more efficiently.

(5) In the bracket 51, the bracket body 52 and the second fastening plate 53 each have the form of a plate and are arranged one upon the other in the thickness direction. The bracket body 52 includes the first positioning holes 54 extending through the bracket body 52 in the thickness direction. The second fastening plate 53 includes the first cutouts 56 in one end of the second fastening plate 53. The first positioning holes 54 are each formed to have the same width as the first cutout 56 in the first direction D3. As viewed in the thickness direction of the second fastening plate 53, part of the first positioning hole 54 and part of the electromagnetic shielding member 40 are located in a region corresponding to the first cutout 56.

With this structure, when coupling the bracket 51 and the electromagnetic shielding member 40, the second fastening plate 53 can be positioned relative to the bracket body 52 by aligning the first positioning holes 54 with the corresponding first cutouts 56. Further, when the electromagnetic shielding member 40 is sandwiched between the bracket body 52 and the second fastening plate 53, the edge of the electromagnetic shielding member is visually recognized through the first cutouts 56 to determine whether the edge is located near the end of the second fastening plate 53. This allows the electromagnetic shielding member 40 to be positioned while being checked through the first cutouts 56. Thus, the electromagnetic shielding member 40 is easily positioned and fastened to the bracket 51 more efficiently.

(6) In the electromagnetic shielding cover 41, the first positioning holes 45 are arranged next to one another in the first direction D1 that is orthogonal to the thickness direction of the fastening portion 44. Further, the first cutouts 47 are arranged next to one another in the first direction D1 in correspondence with the first positioning holes 45. With this structure, when coupling the electromagnetic shielding cover 41 and the electromagnetic shielding member 40, the first fastening plate 43 can be positioned relative to the fastening portion 44 by aligning the first positioning holes 45 of the fastening portion 44 with the corresponding first cutouts 47 of the first fastening plate 43.

In the bracket 51, the first positioning holes 54 are arranged next to one another in the first direction D3 that is orthogonal to the thickness direction of the bracket body 52. Further, the first cutouts 56 are arranged next to one another in the first direction D3 in correspondence with the first positioning holes 54. With this structure, when coupling the bracket 51 and the electromagnetic shielding member 40, the second fastening plate 53 can be positioned relative to the bracket body 52 by aligning the first positioning holes 54 of the bracket body 52 and the corresponding first cutouts 56 of the second fastening plate 53.

(7) The first fastening plate 43 includes the second cutouts 48 in the ends of the first fastening plate 43 in the first direction D1. The fastening portion 44 includes the second positioning holes 46 that are aligned with the second cutouts 48 in the thickness direction. Further, each second cutout 48 is equal in width to the second positioning hole 46 in the second direction D2, which is orthogonal to both of the thickness direction of the fastening portion 44 and the first direction D1. With this structure, when coupling the electromagnetic shielding cover 41 and the electromagnetic shielding member 40, the first fastening plate 43 can be positioned relative to the fastening portion 44 in the first direction D1 and the second direction D2 by aligning the second positioning holes 46 of the fastening portion 44 and the corresponding second cutouts 48 of the first fastening plate 43.

The second fastening plate 53 includes the second cutouts 57 in the ends of the second fastening plate 53 in the first direction D3. The bracket body 52 includes the positioning recesses 55 that are aligned with the second cutouts 57 in the thickness direction. Further, each second cutout 57 is equal in width to the positioning recesses 55 in the second direction D4, which is orthogonal to both of the thickness direction of the bracket body 52 and the first direction D3. With this structure, when coupling the bracket 51 and the electromagnetic shielding member 40, the second fastening plate 53 can be positioned relative to the bracket body 52 in the first direction D3 and the second direction D4 by aligning the positioning recesses 55 of the bracket body 52 and the corresponding second cutouts 57 of the second fastening plate 53.

(8) The first fastening plate 43 of the electromagnetic shielding cover 41 is identical in shape to the second fastening plate 53 of the bracket 51. With this structure, the first fastening plate 43 and the second fastening plate 53 are identical components. This simplifies component management of the connector unit 10.

The present embodiment may be modified as follows. The present embodiment and the following modifications can be combined as long as the combined modifications remain technically consistent with each other.

The electromagnetic shielding member 40 is not limited to a sheet of braiding as described in the above embodiment and may be formed by, for example, a metal foil or the like.

The material of the terminal base 33 is not limited to synthetic resin and may be changed to, for example, metal.

In the electromagnetic shielding cover 41 of the above embodiment, part of the first positioning hole 45 is located in a region corresponding to the first cutout 47 as viewed in the thickness direction of the first fastening plate 43. However, there is no limit to such a structure. The first positioning hole 45 may be entirely located in the region corresponding to the first cutout 47 as viewed in the thickness direction of the first fastening plate 43.

In the bracket 51 of the above embodiment, part of the first positioning hole 54 is located in a region corresponding to the first cutout 56 in the thickness direction of the second fastening plate 53. However, there is no limit to such a structure. The first positioning hole 54 may be entirely located in the region corresponding to the first cutout 56 as viewed in the thickness direction of the second fastening plate 53.

The first fastening plate 43 and the second fastening plate 53 may differ from each other in shape.

In the fastening portion 44, the number of first positioning holes 45 and the number of second positioning holes 46 are not limited to those described in the above embodiment, and may be changed in correspondence with the structure of the electromagnetic shielding cover 41. Further, in the first fastening plate 43, the number of first cutouts 47 and the number of second cutouts 48 are not limited to those described in the above embodiment, and may be changed in correspondence with the structure of the electromagnetic shielding cover 41.

In the bracket body 52, the number of first positioning holes 54 and the number of positioning recesses 55 are not limited to those described in the above embodiment, and may be changed in accordance with the structure of the bracket 51. Further, in the second fastening plate 53, the number of first cutouts 56 and the number of second cutouts 57 are not limited to those described in the above embodiment, and may be changed in correspondence with the structure of the bracket 51.

In the bracket 51 of the above embodiment, the bracket body 52 and the second fastening plate 53 sandwich and fasten one end of the electromagnetic shielding member 40. However, for example, the second fastening plate 53 may be omitted from the bracket 51. In this case, the end of the electromagnetic shielding member 40 may be held and fastened by a folded fastening portion of the bracket body 52 that is formed by bending and deforming part of the bracket body 52.

In the electromagnetic shielding cover 41 of the above embodiment, the fastening portion 44 is fixed to the first fastening plate 43 through swaging with a punch. However, the fastening portion 44 may be fixed to the first fastening plate 43 through, for example, ultrasonic welding, welding, or the like.

In the bracket 51 of the above embodiment, the bracket body 52 is fixed to the second fastening plate 53 through swaging with a punch. However, the bracket body 52 may be fixed to the second fastening plate 53 through ultrasonic welding, welding, or the like.

As shown in FIG. 2, the first connector 11 and the second connector 12 may be fixed to the in-vehicle devices M1 and M2, which are coupling subjects, such that the electric wires 13 are bent. Specifically, the electric wires 13 may each include a first end fastened to the first connector 11, a second end fastened to the second connector 12, a bent portion located between the first end and the second end, a first length portion extending between the first end and the first bent portion, and a second length portion extending between the second end and the bent portion.

As shown in FIG. 1, the electric wires 13 may be arranged next to one another in the same imaginary plane. As shown in FIGS. 1, 3, and 5, the direction in which the electric wires 13 are arranged next to one another may coincide with the first direction D1. The direction in which each electric wire 13 extends from the first connector 11, that is, the extension direction of the first length portion, may coincide with the second direction D2. As shown in FIGS. 2 and 3, in a state in which the first connector 11 and the second connector 12 are fixed to the in-vehicle devices M1 and M2, the first direction D1 may coincide with the first direction D3, and the second direction D2 may coincide with the second direction D4.

As shown in FIG. 2, the electromagnetic shielding member 40 and the bracket 51 may be arranged beside the electric wires 13 to cover the entire electric wires 13 as viewed in the thickness direction of the first fastening plate 43, that is, a direction that is orthogonal to the arrangement direction of the electric wires 13 and the extension direction of the first length portion. The bracket 51 may extend beyond the bent portion of the electric wires 13 and project in the extension direction of the first length portion. The electromagnetic shielding member 40 may oppose the first length portion of the electric wires 13 and does not have to oppose the second length portion of the electric wires 13. The electromagnetic shielding member 40 may be referred to as a meshed electromagnetic shielding member or an electromagnetic shielding sheet.

As shown in FIG. 3, the cover main body 42 may include a number of through holes extending through the cover main body 42 in the thickness direction. A bolt may be inserted into each of the through holes. The bracket 51 may include a through hole extending through the bracket 51 in the thickness direction. A bolt may be inserted into the through hole. As shown in FIGS. 2 and 3, the through hole of the bracket 51 may be arranged at a position separated from the electric wires 13 as viewed in the thickness direction of the bracket 51, that is, a direction that is orthogonal to the arrangement direction of the electric wires 13 and the extension direction of the first length portion. The bracket 51 may be referred to as an electromagnetic shielding bracket.

As shown in FIG. 5, the first fastening plate 43 and the fastening portion 44 may be wider than one end of the electromagnetic shielding member 40 in the first direction D1. The first fastening plate 43 and the fastening portion 44 may sandwich and cover the end of the electromagnetic shielding member 40 over their entire regions in the first direction D1.

As shown in FIG. 6, the bracket body 52 and the second fastening plate 53 may be wider than the other end of the electromagnetic shielding member 40 in the first direction D1. The bracket body 52 and the second fastening plate 53 may sandwich and cover the other end of the electromagnetic shielding member 40 over their entire regions in the first direction D1. The one end of the electromagnetic shielding member 40 may be referred to as the first end, the other end of the electromagnetic shielding member 40 may be referred to as the second end.

As shown in FIG. 2, the fastening portion 44 and the first fastening plate 43 may be curved in opposite directions at the side from where the electromagnetic shielding member extends. The bracket body 52 and the second fastening plate 53 may be curved in opposite directions at the side from where the electromagnetic shielding member 40 extends.

As shown in FIG. 5, the depth of the first cutouts 47 in the second direction D2 may be greater than the width of the first positioning holes 45 in the second direction D2. The depth of the second cutouts 48 in the first direction D1 may be less than the width of the second positioning holes 46 in the first direction D1.

As shown in FIG. 6, the depth of the first cutouts 56 in the second direction D4 may be greater than the width of the first positioning holes 54 in the second direction D4. As shown in FIGS. 3 and 6, the depth of the second cutouts 57 in the first direction D3 may be equal to the width of the positioning recesses 55 in the first direction D3.

The present disclosure includes the following examples. Reference numerals of the components of the exemplary embodiments are given to facilitate understanding and not to limit the scope of the invention. Some of the components described in the following examples may be omitted or combined.

Embodiment 1

In one general aspect, the electric wires (13) may each include a first end fastened to the first connector (11), a second end fastened to the second connector (12), a bent portion located between the first end and the second end, a first length portion extending between the first end and the bent portion, and a second length portion extending between the second end and the bent portion;

the electromagnetic shielding member (40) and the bracket (51) may be arranged beside the electric wires (13) to entirely cover the electric wires (13) as viewed in an orthogonal direction that is orthogonal to an arrangement direction in which the electric wires (13) are arranged next to one another and an extension direction in which the first length portion extends; and the bracket (51) may extend beyond the bent portion and project in the extension direction.

Embodiment 2

In one general aspect, the bracket (51) may include a through hole extending through the bracket (51) in the orthogonal direction; and the through hole may be arranged at a position separated from the electric wires (13) as viewed in the orthogonal direction.

Embodiment 3

In one general aspect, the electromagnetic shielding member (40) may oppose the first length portion of each of the electric wires (13) and not oppose the second length portion of each of the electric wires (13).

The present examples and embodiments are to be considered as illustrative and not restrictive. The scope of the present invention is defined not by the above detailed description, but by the claims and their equivalents, and all variations within the scope of the claims and their equivalents are to be construed as being included in the disclosure.

REFERENCE SIGNS LIST

10 connector unit
11 first connector
12 second connector
13 electric wire
14 shield unit
21 first terminal
22 first holder
23 base
24 resin member
25 open portion
31 second terminal (terminal)
32 second holder (holder)
33 terminal base
34 base body
35 collar
40 electromagnetic shielding member
41 electromagnetic shielding cover
42 cover main body
43 first fastening plate (fastening plate)
44 fastening portion
45 first positioning hole (positioning hole)
46 second positioning hole
47 first cutout (cutout)
48 second cutout
51 bracket
52 bracket body
53 second fastening plate
54 first positioning hole
55 positioning recess
56 first cutout
57 second cutout
A1 press mark
A2 press mark
D1 first direction
D2 second direction
D3 first direction
D4 second direction
M1 first in-vehicle device
M2 second in-vehicle device
P1 first positioning pin
P2 second positioning pin

The invention claimed is:

1. A connector unit, comprising:

a first connector;

a second connector;

electric wires electrically connecting the first connector and the second connector;

an electromagnetic shielding cover fixed to the first connector to cover the first connector;

an electromagnetic shielding member arranged beside the electric wires and formed by a conductor having the form of a sheet; and a bracket formed by a conductor, wherein:

the electromagnetic shielding cover includes a cover main body and a fastening plate fixed to the cover main body;

the cover main body and the fastening plate sandwich an end of the electromagnetic shielding member such that the end is integrated with the first connector;

the bracket is fastened to another end of the electromagnetic shielding member; and the bracket is separated from the second connector and not integrated with the second connector, the cover main body and the fastening plate each have the form of a plate and are arranged one upon the other in a thickness direction, a direction orthogonal to the thickness direction is a first direction, and a direction orthogonal to both of the thickness direction and the first direction is a second direction;

the cover main body includes a first positioning hole used for positioning and a second positioning hole used for positioning the fastening plate with respect to the cover main body in the first direction and the second direction;

the first positioning hole and the second positioning hole extend through the cover main body in the thickness direction;

the fastening plate includes a first cutout recessed in the second direction from an end of the fastening plate in the second direction, and a second cutout recessed in the first direction from an end of the fastening plate in the first direction;

the first positioning hole and the first cutout are equal in width in the first direction;

as viewed in the thickness direction of the fastening plate, part or all of the first positioning hole and part of the electromagnetic shielding member are located in a region corresponding to the first cutout;

the second positioning hole and the second cutout are equal in width in the second direction; and as viewed in the thickness direction of the fastening plate, the second cutout is aligned with the second positioning hole.

2. The connector unit according to claim 1, wherein the second connector includes terminals respectively connected to the electric wires, a holder holding the terminals and formed from synthetic resin, and a terminal base coupled to an in-vehicle device and formed from synthetic resin.

3. The connector unit according to claim 1, wherein the electromagnetic shielding member covers only one side of the electric wires in a direction orthogonal to a direction in which the electric wires are arranged next to one another.

* * * * *